United States Patent [19]
Jodoin et al.

[11] Patent Number: 5,812,652
[45] Date of Patent: Sep. 22, 1998

[54] CENTRALIZED MANAGEMENT AND ALLOCATION OF BRIDGES IN A TELECOMMUNICATIONS NETWORK FOR A MEET-ME CONFERENCING SERVICE

[75] Inventors: Sylvain Jodoin, Montreal; Joanne Pilkington, St-Bruno; Pierre Belzile, Lachine; Charles Meubus, Westmount, all of Canada

[73] Assignee: Northern Telecom Limited, Montreal, Canada

[21] Appl. No.: 723,080

[22] Filed: Sep. 30, 1996

Related U.S. Application Data

[60] Provisional application No. 60/009,224 Dec. 26, 1995.
[51] Int. Cl.$^6$ ................................................ H04M 3/56
[52] U.S. Cl. .......................... 379/205; 379/202; 379/207; 379/220; 370/261
[58] Field of Search .................................. 379/202, 203, 379/204, 205, 206, 207, 188, 196, 197, 198, 219, 220, 221, 242, 243; 370/260, 261, 262

[56] References Cited

U.S. PATENT DOCUMENTS

| | | | |
|---|---|---|---|
| 4,455,455 | 6/1984 | Little | 379/203 |
| 4,460,807 | 7/1984 | Kerr et al. | 379/205 |
| 4,509,167 | 4/1985 | Bantel et al. | 370/261 |
| 4,540,850 | 9/1985 | Herr et al. | 370/261 |
| 4,550,224 | 10/1985 | Winchell | 370/261 |
| 4,635,251 | 1/1987 | Stanley et al. | 370/261 |
| 4,796,293 | 1/1989 | Blinken et al. | 379/202 |
| 5,099,510 | 3/1992 | Blinken, Jr. et al. | 379/202 |
| 5,379,280 | 1/1995 | Cotton et al. | 370/268 |
| 5,408,518 | 4/1995 | Yunoki | 379/67 |
| 5,408,526 | 4/1995 | McFarland et al. | 379/202 |
| 5,440,563 | 8/1995 | Isidoro et al. | 370/270 |
| 5,483,587 | 1/1996 | Hogan et al. | 379/202 |
| 5,526,413 | 6/1996 | Cheston, III et al. | 379/207 |
| 5,546,449 | 8/1996 | Hogan et al. | 379/202 |
| 5,619,555 | 4/1997 | Fenton et al. | 379/202 |
| 5,638,434 | 6/1997 | Gottlieb et al. | 370/260 |
| 5,642,156 | 6/1997 | Saiki | 379/202 |

*Primary Examiner*—Ahmad F. Matar
*Assistant Examiner*—Scott Wolinsky
*Attorney, Agent, or Firm*—John A. Granchelli; Dallas F. Smith

[57] ABSTRACT

The invention manifests a secure, on-demand meet-me conferencing service embodied within a telephone network having an advanced intelligent network (AIN) infrastructure. Centralized control of conferencing bridges located in network switches is effected at a service control point (SCP) in the AIN telephone network. Routing and availability information with respect to the conferencing bridges is maintained by the SCP. When the SCP in communication with a network switch processing a call determines that the call is to initiate a conference, a bridge is allocated to the call. The availability information of the bridge is then updated and the SCP provides the network switch with routing instructions for connecting the call through the telephone network to the bridge.

48 Claims, 2 Drawing Sheets

CENTRALIZED MANAGEMENT AND ALLOCATION OF BRIDGES IN A TELECOMMUNICATIONS NETWORK FOR A MEET-ME CONFERENCING SERVICE

RELATED APPLICATIONS

This application is related to copending U.S. patent application Ser. No. 08/723,081, entitled "SUBSCRIPTION AND PAIRED AUTHORIZATION CODE BASED ACCESS TO A MEET-ME CONFERENCING SERVICE", which was filed concurrently herewith on Sep. 30, 1996 and is incorporated herein by reference. This application claims the benefit of U.S. Provisional Application No. 60/009,224, filed Dec. 26, 1995.

BACKGROUND OF THE INVENTION

The present invention relates generally to telephony conferencing services and, in particular, to a secure, on-demand, meet-me conferencing service based on an advanced intelligent network (AIN) infrastructure.

Prior art telephony conferencing systems have been either switch-based or centralized in conference nodes. With switch-based systems, conferencing bridges are local to the switch and are available for use only to the community served by the switch. For a fixed grade of service, these implementations suffer from lower efficiency in the use of conferencing bridges than can be achieved by pooling of resources across the network. In case of centralized conference nodes, audio conferencing bridges are centrally located and serve a multiplicity of switches. The main drawback of the centralized conference nodes is that it leads to trunking inefficiency. Accordingly, conference services are relatively expensive and require facility reservation in advance of the conference, which constitutes an impediment to their use.

SUMMARY OF THE INVENTION

It is an object of the present invention to provide a new and improved conferencing service.

The invention, therefore, according to a first broad aspect provides in a telecommunications network including a plurality of switching systems, one or more of which having one or more conference bridges, a method of effecting a conferencing service comprising the steps of: maintaining routing and availability information with respect to the one or more conference bridges; wherein a bridge that is not allocated to a call is available determining by a service controller, in communication with one of the switching systems processing an initiating call, that the initiating call is to initiate a conference; allocating a particular bridge which the availability information indicates is available to the initiating call; updating the availability information associated with the particular bridge to indicate that the particular bridge is allocated to the initiating call; and providing by the service controller, to the switching system processing the initiating call, instructions for routing the initiating call based on the routing information associated with the particular bridge, whereby the initiating call is connected through the network to the particular bridge.

In accordance with a second broad aspect of the invention, there is provided in a telecommunications network including a plurality of switching systems, one or more of which having one or more conference bridges, a system for effecting a conferencing service comprising: means for maintaining routing and availability information with respect to the one or more conference bridges wherein a bridge that is not allocated to a call is available; means for determining by a service controller, in communication with one of the switching systems processing a call, that the call is to initiate a conference; means for allocating a particular bridge which the availability information indicates is available to the initiating call; means for updating the availability information associated with the particular bridge to indicate that the particular bridge is allocated to the initiating call; and means for providing by the service controller, to the switching system processing the initiating call, instructions for routing the initiating call based on the routing information associated with the particular bridge, whereby the initiating call is connected through the network to the particular bridge.

The invention, as a particular embodiment, manifests a secure, on-demand meet-me conferencing service that may be implemented within a telecommunications network having an advanced intelligent network (AIN) infrastructure. Centralized management and allocation of provisioned conferencing bridges located in network switches is effected at a service control point in the AIN, thereby overcoming the resource efficiency limitations and corresponding costs of the prior art systems. In addition, it enables a local exchange carrier (LEC) to offer a new type of telephony conferencing service at a lower cost where prior reservation of conferencing facilities is no longer necessary and which possesses other advantages with respect to ease of use, ease of administration, availability and security.

The AIN infrastructure may be characterized as a telecommunication network (i.e., public switched telephone network or PSTN) comprising a signaling system 7 (SS7) signaling network which may connect service switching points (SSPs) equipped with an AIN call model, signal transfer points (STPs) and service control points (SCPs) together through an SSP-SCP Transaction Capabilities Application Part (TCAP) based AIN signaling. The SSP AIN call model and SSP-SCP AIN signaling refer to Bellcore AIN 0.1 and following releases. A conferencing bridge is a well known hardware element that permits multiple users to conference telephone calls, and associated with each bridge may be two predetermined directory numbers (DNs) whereby calls to either are routed by the telecommunications network to the corresponding bridge. One of the two DNs (i.e., chairperson DN) enables a call thereto to initiate a conference at the corresponding bridge and the other DN (i.e., participant DN) enables calls thereto to join the initiated conference at that bridge. A chairperson may be a valid end-user who initiates a conference, and a participant or conferee may be any valid end-user who dials in a living conference initiated by the chairperson. Alternatively, where a distinct chairperson to initiate a conference is not necessary, a bridge in the network may be associated with only a single DN and a conference at that bridge is initiated simply by the first call connected thereto.

Other advantages of the conferencing service include that all valid end-users may initiate a conference at any time, prior reservation of a bridge not being necessary. The bridges available within the network are centrally managed and allocated thereby offereing practically unlimited conferencing service in respect of users and duration. The service also provides security, confidentiality, billing flexibility, and may be used by various types of end-users. Furthermore, the method of the present invention provides much latitude in the ways a local exchange carrier may configure its particular conferencing service.

To initiate a conference, a valid end-user only needs to dial the directory number to access the conferencing service, and identify himself or herself. After validation, the end-user is connected to a conferencing bridge. The end-user becomes the chairperson of the conference.

Due to the dynamic conferencing bridge allocation mechanism, introduced by the invention, the service does not need to know in advance which bridge would be used for a given conference. Consequently, there is no need to control conference duration and limit conferencing bridge usage. The conferencing bridges are used on a first come, first served basis. The LEC needs not to impose any limit on the participants of the conference, for which size is only dependent upon the conferencing bridges' capability and port availability.

All conferences (i.e., the chairperson and participants) are ensured complete confidentiality and security. Only valid and authorized conferees are allowed access to the conference, using paired primary and secondary authorization codes. The service allows for various ways to access a conference, for example, by credit card or calling card and by calling line identification (CLID) or automatic number identification (ANI).

This conferencing service in which conferencing bridges are not booked in advance but rather are used only when and for the duration required, gives significant flexibility in how the LEC may bill for the service. In addition to the conventional conference services billing models, the system and its method allow to bill for the real port-time usage by end-users. That is, if a participant hasn't attended the whole conference, the port usage can be billed only for the duration it has been used.

A universal service is achieved in that end-users may be of any type, i.e., residential or business, calling from any line or trunk type including but not limited to POTS, CLASS, Centrex, cellular or PCS, calling from a PBX or Key system, homing or not on a particular manufacturer's switching product. Also, the conferencing bridges may be shared with other switch-based conferencing services, for example, three-way calling.

BRIEF DESCRIPTION OF THE DRAWINGS

The invention will be better understood from the following description of a conferencing service together with reference to the accompanying drawing, in which.

DETAILED DESCRIPTION

The methodology, in accordance with the present invention, for providing a secure, on-demand meet-me conferencing service is premised on the utilization of a AIN infrastructure of a telecommunications network to centrally manage and allocate conference bridges distributed throughout network switches to calls originating anywhere in the network. The distributed conferencing facilities are now viewed by the whole network as a common pool of conferencing resources available for use to all network calls, originating and/or terminating anywhere therein, whereby the available resources within the pool are shared for more efficient use. A LEC can thereby provide additional conferencing services in terms of geographical diversity and thus serve a larger population without adding further conferencing facilities to service specific geographic regions and without any impediment to the current conferencing services.

Figure 1:
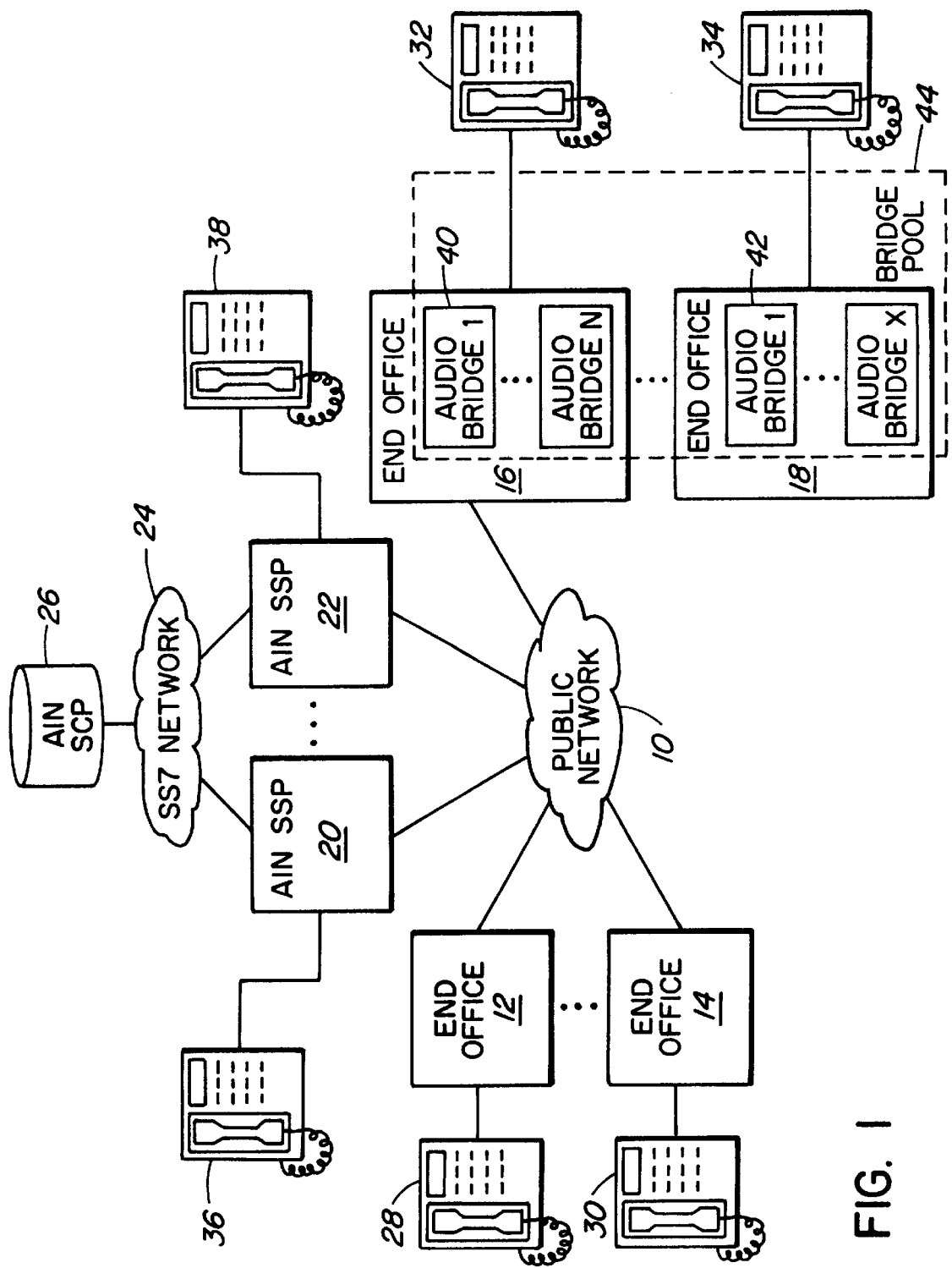
FIG. 1 is a block diagram representation of elements within a telephone network defining an embodiment for implementing the conferencing service.

Referring to FIG. 1, depicted to exemplify the conferencing service is a representation of a public switched telephone network (PSTN) 10 comprising various switching elements and network facilities which are shown exterior to the PSTN 10 simply for purposes of illustration. The switching elements consist of end offices 12, 14, 16 and 18, and AIN SSPs 20 and 22 which are communicatively coupled through a SS7 network 24 to an AIN SCP 26. Each switching element may have connected thereto a plurality of telephone sets which are represented in FIG. 1 by telephone sets 28, 30, 32 and 34 connected to end offices 12, 14, 16 and 18, respectively, and telephone sets 36 and 38 connected to AIN SSPs 20 and 22, respectively. The AIN SSPs 20 and 22 constitute switching elements equipped with the AIN call model while the end office 12, 14, 16 and 18 constitute switches which may not be equipped with such a model. The SS7 network 24 provides signaling links between the SSPs and between the SSPs and SCPs within the PSTN 10 which, of course, includes further facilities to link the various switching elements depicted.

End offices 16 and 18 are each equipped with a plurality of conferencing bridges 40 and 42, respectively, which together define a network pool 44 of bridge resources. The bridge pool 44 may be shared throughout the PSTN 10 and utilization thereof is not limited to users at telephone sets 32 and 34 which are directly connected to the offices 16 and 18. An end-user may originate a call from any switch and connect to the on-demand meet-me conferencing service. The AIN SCP 26 executes the method whereby this service is implemented. Moreover, it noted that the conferencing bridges of the bridge pool 22 may be provisioned in any of the switching elements within the PSTN 10, including AIN SSPs and that only end offices 16 and 18 are shown having conferencing bridges 40 and 42 for simplicity.

Figure 2:
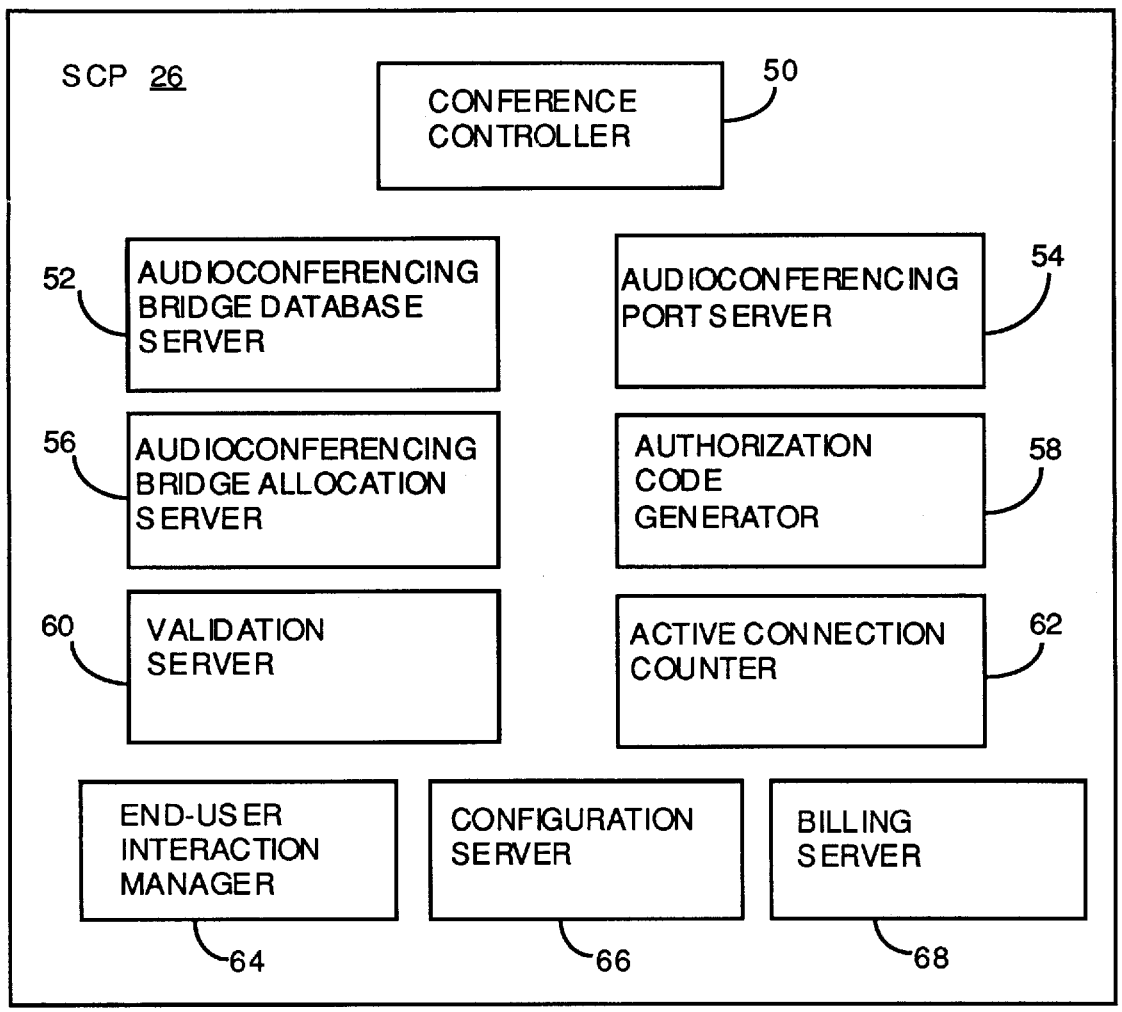
FIG. 2 is a block diagram representation of functions effected by a service control point in the telephone network.

The AIN infrastructure of the PSTN 10 provides a platform on which the telephony conference service is based and, specifically, the AIN SCP 26 which is programmed with the logic to implement the method for effecting the service. Functions introduced by the method and provided by the AIN SCP 26, as identified in FIG. 2, include a Conference Controller 50, Audioconferencing Bridge Database Server 52, Audio conferencing Port Server 54, Audioconferencing Bridge Allocation Server 56, Authorization Code Generator 58, Validation Server 60, Active Connection Counter 62, End-user Interaction Manager 64, Configuration Server 66 and Billing Server 68 processes.

The Conference Controller 50 is invoked by the SCP 26 upon recognizing calls from end-users are to the conferencing service and coordinates, for a given conference, the accesses to the other functions of this method.

The Audioconferencing Bridge Database Server 52 maintains routing and availability information in respect of the bridge pool 44. The routing information for each bridge 40, 42 may include a first DN (i.e., a chairperson meet-me conferencing DN or C-$DN_{mm}$) whereby a user constituting the chairperson initiates and terminates a conference at the corresponding bridge, and a second DN (i.e., a participant meet-me conferencing DN or P-$DN_{mm}$) whereby users join conferences at that bridge. Alternatively, only a single DN may be associated with a bridge, in which case a conference at that bridge is initiated simply by the first call connected to that DN. The availability information may indicate status of the bridges 40, 42 within the bridge pool 44, for example, whether a particular bridge is in use or free. It receives its usage information from the Audioconferencing Bridge Allocation Server 56 and the Conference Controller 50.

The responsibility of the Audioconferencing Port Server 54 is to keep track of the port usage by the conferencing service, for each bridge in the pool 44 on a switch basis. This functionality can be enhanced to include an up-to-date network image of the port usage by the conferencing service and all the other services (e.g., 3-way call, centrex conferencing) in order to minimize, if not eliminate, the possibility of blockage at conference time. A blocking situation, for example, is when a chairperson can not establish a conference due to unavailablity of bridges or circuits, or participants can't dial in a living conference for the same reason.

The Audioconferencing Bridge Allocation Server 56 implements the algorithm that, upon receiving a conference request from the Conference Controller 50, selects and allocates an available bridge from the list of free conferencing bridges which is obtained from the Audioconferencing Bridge Database Server 52. In doing this, it takes into account the port usage figures that it receives from the Audioconferencing Port Server 54.

The Authorization Code Generator 58 has the responsibility to generate the paired primary and secondary authorization codes by which the chairperson and the participants, respectively, may access a particular conference through this service. These paired primary and secondary codes are unique for use by a specific group of end-users, and the Authorization Code Generator 58 is responsible for maintaining all valid code pairs.

The Validation Server 60 authorizes the various accesses to the service, for example, by correlating primary and secondary authorization codes received from end-users to the valid code pairs maintained by the Authorization Code Generator 58, and by validating credit card or calling card information received from end-users. Alternatively, the Validation Server 60 may confirm receipt of the ANI or CLID of calls from end-users so that service usage may be automatically billed to the received ANI/CLID. Techniques for validation of and billing to credit cards, calling cards, and the calling line ANI/CLID are well known and any suitable one may be used.

The Active Connection Counter 62 keeps track of the number of active connections in a conference.

The End-user Interaction Manager 64 implements the end-user interface. It manages the prompt and collect sessions through interaction with a service switching point within the AIN infrastructure, using conventional SS7 signaling and commands.

The Configuration Server 66 is an optional function that provides the Audioconferencing Bridge Allocation Server 56 with network topology information that can be used to allocate the bridges to optimize the use of network transmissions.

The Billing Server 68 stores all pertinent usage information on a conference basis. For instance, it maintains a correlation between the credit or calling card number or the ANI/CLID of the chairperson and the paired authorization codes, in association with a particular conference. The times for initiation and termination of the conference by the chairperson may be recorded by the Billing Server 68 and, furthermore, the times at which each participant joins and leaves the conference may also be recorded. This information may be subsequently used by the LEC to perform the appropriate billing.

Turning now to the operation of the conferencing service, with reference again to FIG. 1, the following describes a particular implementation of a method for effecting the service based on credit or calling card authorized access thereto. A typical sequencing of events is provided which illustrates how the method uses functionality existing within the elements of the PSTN 10 and particularly the AIN infrastructure. However, it should be understood that various sequencing combinations of the method steps can be envisioned and therefore, it is not a specific sequencing of events that constitutes this method but rather the use of the network elements, functionality to implement the service. Also, the description uses conventional terminology to refer to known functionality defined by Bellcore AIN 0.1.

Briefly, in the card-based approach, no pre-subscription is required, and a credit card or a calling card can be used for billing purposes. In this case, when an end-user wants to establish a conference, he/she calls in advance a code assignment DN and provides either a credit or calling card number. In return, the end-user is provided with two perishable authorization codes, a primary and a secondary one. The perishable authorization codes' validity period can be limited in different ways, including but not limited to the following: pre-determined number of conferences, absolute time, i.e., for a limited time period, conference time, conference size and any combinations of the previous. At time of conference, the chairperson dials a conference DN and uses the primary perishable authorization code to initiate the conference, whereas the participants dial the conference DN and use the secondary perishable authorization code to access the conference. Depending on the LEC's service requirements, the code assignment DN and the conference DN could be the same or different, and need not be unique to each end-user.

Prior To A Conference

1) An end-user, for example, at telephone set 28 (hereinafter referred to as end-user 28) wants to establish a conference using his/her calling card:

End-user 28 dials the code assignment DN ($DN_{code}$). This DN can be unique within the LEC's territory or unique within a particular region only of the territory.

2) End-office 12 translates and routes:

End-office 12 translates the $DN_{code}$ and routes it, through the public network 10, to the switch that owns it, such as AIN SSP 20 in this example.

3) Triggering and querying:

In AIN SSP 20, an AIN SSP trigger is attached to $DN_{code}$. This trigger can either be of type 3/6/10-Digit Public Office Dialing Plan (PODP) or Termination_Attempt (TAT). When the call hits the trigger, the AIN call model verifies that the triggering criteria are met and then launches an AIN query to the SCP 26 through the SS7 network 24. If the trigger is of type PODP, an Info_Analyzed message is sent. If the trigger is of type TAT, a Termination_Attempt message is sent.

4) SCP 26 analyzes the SSP query:

SCP 26 service logic initiates a prompt and collect session with the calling end-user. To do so, it sends a Send_To_Resource message to the AIN SSP 20 with the announcement ID and the number of digits to collect.

5) AIN SSP 20 prompts and collects service request from end-user 28:

Upon reception of the Send_To_Resource message, AIN SSP 20 establishes a voice path with end-user 28 and prompts end-user 28 for service selection. End-user 28, through telephone keypad, selects Calling Card service option. AIN SSP 20 collects end-user 28's digits and packages them in a Resource_Clear message that is sent to the SCP 26.

6) SCP 26 analyzes the collected digits:

SCP 26 service logic recognizes that end-user 28 has selected the Calling Card service option. Similar to steps 4 and 5, the SCP sends a Send_To_Resource message to the AIN SSP 20 with the announcement ID for calling card number and the number of digits to collect. AIN SSP 20 plays the announcement and then collects end-user 28's calling card number and packages them in a Resource_Clear message that is sent to SCP 26.

7) SCP 26 validates card number and assigns authorization codes:

Upon reception of the Resource_Clear message, SCP 26 validates end-user 28's calling card number. If validation is successful, SCP 26 generates two unique perishable authorization codes, namely a primary code and a secondary code. SCP 26 then instructs AIN SSP 20 to play the authorization codes to end-user 28. This is done by sending a Send_To_Resource message to AIN SSP 20.

8) AIN SSP 20 plays announcement containing the authorization codes:

Upon reception of the Send_To_Resource message, the AIN SSP 20 plays the authorization codes to end-user 28. End-user 28 hangs up and the call is torn down.

9) End-user 28 distributes secondary authorization code:

End-user 28 distributes the secondary authorization code to all end-users expected to participate in the conference. For illustration, an end-user at telephone set 30 (hereinafter referred to as end-user 30) is assumed to be one of these participants.

At Time Of Conference

10) End-user 28 initiates the conference:

To start the conference, end-user 28 dials the on-demand meet-me conferencing DN ($DN_{conf}$).

11) Same as steps 2 to 4 but applied to $DN_{conf}$ in this context.

12) AIN SSP 20 prompts and collect service request from end-user 28:

Upon reception of the Send_To_Resource message, AIN SSP 20 establishes a voice path with end-user 28 and prompts end-user 28 for service selection. End-user 28, through telephone keypad, provides the primary perishable authorization code. AIN SSP 20 collects end-user 28's digits and packages them in a Resource_Clear message that is sent to the SCP 26.

13) SCP 26 analyzes collected digits:

SCP 26 service logic recognizes that end-user 28 has provided a primary perishable authorization code which indicates that end-user 28 wants to initiate a conference and that he/she is the chairperson. The SCP 26 service logic then performs the following:

i) Validates the primary perishable authorization code.
   ii) From its internal list of all the conferencing bridges that are part of the common pool, the SCP 26 selects a free bridge. In this example, each bridge is identified by a chairperson meet-me DN ($C-DN_{mm}$) and the corresponding participant meet-me DN ($P-DN_{mm}$). The chairperson meet-me DN is a DN that gives end-user control over conference initiation and termination. However, in the case where the bridge is identified by a single DN, a conference is initiated by the first call connected to that bridge. The SCP 26 allocates the selected $C-DN_{mm}$ to this conference. For this example, it is assumed that the $C-DN_{mm}$ corresponds to conferencing bridge 40 homing on end-office 16.
   iii) Marks the selected $C-DN_{mm}$ as being in use.
   iv) Updates its records on the number of conference ports in used on end-office 16.
   v) Records conference call start time.
   vi) Increases by 1 the active connections counter for this conference.
   vii) Assigns a unique Echo_Data parameter to this conference connection.
   viii) Instructs AIN SSP 20 to route the call to $C-DN_{mm}$. This is done by sending an Analyze_Route response to AIN SSP 20 if the original query was an Info_Analyze message or a Forward_Call response if the original query was a Termination_Attempt message. Together with the Analyze_Route or Forward_Call message, the SCP 26 sends a Send_Notification message containing the Echo_Data parameter. This instructs the AIN SSP 20 to notify the SCP 26 when the call terminates and to use the Echo_Data parameter as the call identifier.

14) AIN SSP 20 routes to $C-DN_{mm}$:

Upon reception of the Analyze_Route or Forward_Call message together with the Send_Notification message, the AIN SSP 20 routes the end-user 28's call to the $C-DN_{mm}$ through the public network 10 to end-office 16. In addition, it flags the call as requiring termination notification to the SCP-26.

15) End-office 16 connects call to conferencing bridge:

Upon reception of call request to $C-DN_{mm}$, end-office 16 starts a conference using conferencing bridge 40 and connects end-user 28 through a particular port on the bridge 40 to the conference.

16) End-user 30 dials in the conference:

In order to connect to the conference, end-user 30 dials the on-demand meet-me conferencing DN ($DN_{conf}$).

17) Same as steps 2 to 4, but applied to end-office 14 in this context.

18) AIN SSP 20 prompts and collects service request from end-user 30:

Upon reception of the Send_To_Resource message, AIN SSP 20 establishes a voice path with end-user 30 and prompts end-user 30 for service selection. End-user 30, through telephone keypad, provides the secondary perishable authorization code. AIN SSP 20 collects end-user 30's digits and packages them in a Resource_Clear message that is sent to the SCP 26.

19) SCP 26 analyzes the collected digits:

SCP 26 service logic recognizes that end-user 30 has provided a secondary perishable authorization code which indicates that end-user 30 wants to dial in a living conference. The SCP 26 service logic then performs the following:

i) Validates the secondary perishable authorization code.
   ii Correlates this secondary authorization code with the chairperson's primary authorization code. This is necessary to retrieve the conferencing bridge that has been allocated to this conference, i.e., $C-DN_{mm}$. From $C-DN_{mm}$, the SCP 26 retrieves the corresponding participant meet-me conference DN, i.e., $P-DN_{mm}$. That DN gives only right to access a living conference initiated by $C-DN_{mm}$.
   iii) Records conference call start time for this participant.
   iv) Increases by 1 the active connections counter for this conference.
   v) Updates its records on the number of conference ports in used on end-office 16.
   vi) Assigns an Echo_Data parameter which is a unique call identifier.
   vii) Instructs AIN SSP 20 to route the call to $P-DN_{mm}$. This is done by sending an Analyze_Route response to AIN SSP 20 if the original query was an Info_Analyze message or a Forward_Call response if the original query was a Termination_Attempt message. Together with the Analyze_Route or Forward_Call message, the SCP 26 sends a Send_Notification message containing the Echo_Data parameter. This instructs the AIN SSP 20 to notify the SCP 26 when the call terminates and use the Echo_Data parameter as the call identifier.

20) AIN SSP 20 routes to P-DN$_{mm}$:

Upon reception of the Analyze_Route or Forward_Call message together with the Send_Notification message, the AIN SSP 20 routes the end-user 30's call to the P-DN$_{mm}$ through the public network 10 to end-office 16. In addition, it flags the call as requiring termination notification to the SCP 26.

21) End-office 16 connects call to conferencing bridge:

Upon reception of the call request to P-DN$_{mm}$, end-office 16 connects end-user 30 to the conference that has been initiated by C-DN$_{mm}$, using an available port on the bridge 40. End-user 28 and end-user 30 are now conferenced.

22) Other participants dialing in:

Steps 16 to 21 are repeated for all conference participants, as long as the conference is active.

Conference Termination

23) End-user 30 hangs up:

Responsive to end-user 30 hanging up:

i) The voice connection to conferencing bridge 40 is torn down.

ii) End-office 16 releases the conferencing bridge 40's conference port and makes it available for other conferences. It is noted, however, that whether or not the conference port can be made available for other conferences on a single port basis or only on a group of ports basis depends on the conferencing bridge hardware and provisioning on the switch.

iii) The AIN SSP 20 detects call release and sends a Termination_Notification message to the SCP 26, the message including: the Echo_Data parameter assigned by SCP 26 to this call connection; the Termination_Indicator; and the Connect_Time for the call.

24) SCP 26 receives the Termination_Notification message from AIN SSP 20:

Upon reception of the Termination_Notification message from AIN SSP 20, SCP 26 correlates the Echo_Data parameter with end-user 30's connection and then performs the following actions:

i) Records conference call stop time for this participant.

ii) Decreases by 1 the active connections counter for this conference.

iii) Updates its records on the number of conference ports in used on end-office 16.

25) Other participants hang up:

Steps 23 and 24 are repeated for all participants that hang up during an active conference.

26) End-user 28 hangs up:

Responsive to end-user 28 hanging up:

i) The voice connection to conferencing bridge 40 is torn down.

ii) End-office 16 releases the conferencing bridge 40's conference port and makes it available for other conferences.

iii) If end-user 28 has been connected using a chairperson's DN (C-DN$_{mm}$) with conference termination control, end-office 16 terminates the conference and all active connections to the conference are torn down. Otherwise, if end-user 28 has been connected using a C-DN$_{mm}$ without conference termination control, end-office 16 doesn't terminate the entire conference. Consequently, that conference terminates when all participants have hung up.

iv) AIN SSP 20 detects call release and sends a Termination_Notification message to the SCP 26, the message being populated with: the Echo_Data parameter assigned by SCP 26 to this call connection; the Termination_Indicator; and the Connect_Time for the call.

27) SCP 26 receives the Termination_Notification message from AIN SSP 20:

Upon reception of the Termination_Notification message from AIN SSP 20, SCP 26 correlates the Echo_Data parameter with end-user 28, i.e., the chairperson's connection and then performs the following actions:

i) Records conference call stop time for the chairperson.

ii) Decreases by 1 the active connections counter for this conference.

iii) Updates its records on the number of conference ports in used on end-office 16.

iv) Updates its database with billing information.

v) Marks the C-DN$_{mm}$ as being available for another conference, if end-user 28 has been connected using a C-DN$_{mm}$ with conference termination control. If end-user 28 has been connected using a C-DN$_{mm}$ without conference termination control, the C-DN$_{mm}$ is marked available for another conference only when all participants have hung up.

Hence, the termination of the conference is complete.

An alternative to the above described method of card-based access to the meet-me conferencing service is for the service to authorize access based on the calling line of the user. In this approach, where no pre-subscription is required, the service is billed to the calling line. The DN to be charged is either obtained using the Automatic Number Identification (ANI) service or the Calling Line ID (CLID) service. It is up to the service provider to decide which line identifier is to be used for billing purposes. For simplicity, ANI/CLID is used hereinafter to refer to either the ANI or the CLID. When an end-user wants to establish a conference, he/she calls in advance a code assignment DN. The system records the end-user's ANI/CLID and provides him/her with two perishable authorization codes, a primary and a secondary one. The perishable authorization codes' validity period can be limited in different ways, including but not limited to the following: pre-determined number of conferences, absolute time, i.e., for a limited time period, conference time, conference size and any combinations of the previous. Prior to the conference, the end-user distributes the secondary perishable authorization code to the required conference participants. At time of conference, the end-user dials a conference DN and uses the primary perishable authorization code to initiate the conference, whereas the participants dial the conference DN and use the secondary perishable authorization code to access the conference. Depending on the LEC's service requirements, the code assignment DN and the conference DN could be the same or different and need not be unique to an end-user. The same code assignment and conference DNs may be shared by multiple, and even, all subscribers. This approach also permits to support other billing models. The LEC may provide a service where each participant is billed to his/her ANI/CLID for his/her access to the conference.

Operation of the meet-me conferencing service utilizing the AIN/CLID based access approach, prior to a conference, involves the following steps:

1) An end-user, for example, at telephone set 28 (hereinafter referred to as end-user 28) wants to establish a conference:

End-user 28 dials the code assignment DN (DN$_{code}$).

2) End-office 12 translates and routes:

End-office 12 translates the DN$_{code}$ and routes it, through the public network 10, to the switch that owns it, such as AIN SSP 20 in this example. In the routing process, the end-user 28's ANI/CLID is delivered from end-office 12 to public network 10 and then to AIN SSP 20.

3) Triggering and querying:

In AIN SSP 20, an AIN SSP trigger is attached to DN$_{code}$. This trigger can either be of type 3/6/10-Digit Public Office Dialing Plan (PODP) or Termination_Attempt (TAT). When the call hits the trigger, the AIN call model verifies that the triggering criteria are met and then launches an AIN query to the SCP 26 through the SS7 network 24. If the trigger is of type PODP, an Info_Analyzed message is sent. If the trigger is of type TAT, a Termination_Attempt message is sent. As part of the query to SCP 26, the ANI/CLID information is sent as the Charge_Number in case of ANI and Calling_Party_D in case of CLID.

4) SCP 26 analyzes the SSP query:

SCP 26 service logic records the ANI/CLID and initiates a prompt and collect session with the calling end-user 28. To do so, it sends a Send_To_Resource message to the AIN SSP 20 with the announcement ID and the number of digits to collect.

5) AIN SSP 20 prompts and collects service request from end-user 28:

Upon reception of the Send_To_Resource message, AIN SSP 20 establishes a voice path with end-user 28 and prompts end-user 28 for service selection. End-user 28, through telephone keypad, selects ANI/CLID service option. AIN SSP 20 collects end-user 28's digits and packages them in a Resource_Clear message that is sent to the SCP 26.

6) SCP 26 validates ANI/CLID and assigns authorization codes:

Upon reception of the Resource_Clear message, SCP 26 validates end-user 28's ANI/CLID. Validation in this case may consist of ensuring that the ANI/CLID hasn't been denied access to the service. Other validations are also possible. If validation is successful, SCP 26 generates a unique perishable authorization code pair, namely a primary code and a secondary code. SCP 26 then instructs AIN SSP 20 to play the authorization codes to end-user 28. This is done by sending a Send_To_Resource message to AIN SSP 20.

7) AIN SSP 20 plays the authorization codes:

Upon reception of the Send_To_Resource message, the AIN SSP 20 plays the authorization codes to end-user 28. End-user 28 hangs up and the call is torn down.

8) End-user 28 distributes secondary perishable authorization code:

End-user 28 distributes the secondary perishable authorization code to all end-users expected to participate in the conference. For illustration, an end-user at telephone set 30 (hereinafter referred to as end-user 30) is assumed to be one of these participants.

Subsequent operational steps effected at time of the conference and in termination of the conference are substantially similar to those described above in relation to the card-based approach, except that billing for uses of the service is applied to the ANI/CLID of the chaiperson in this instance.

Those skilled in the art will recognize that various modifications and changes could be made to the invention without departing from the spirit and scope thereof. For instance, a specific embodiment of an audio conferencing service has been described, but the invention may be adapted to a combined audio/video conferencing service. Also, as an alternative to the paired primary and secondary authorization codes, a single authorization code (e.g., the primary code and the secondary code are the same) may be used by each party expected to participate in a conference, such that no one party is explicitly identified as the chairperson. In the one code access scheme, the first participant to access the service using that code would invoke the conference, and the other participants who subsequently access the conferencing service using the same code are joined to the conference initiated by the first participant. It should therefore be understood that the claims are not to be considered as being limited to the precise embodiments of the conferencing service set forth above, in the absence of specific limitations directed to each embodiment.

We claim:

1. In a telecommunications network including a plurality of switching systems, one or more of which having one or more conference bridges, a method of effecting a conferencing service comprising the steps of:

maintaining routing and availability information with respect to the one or more conference bridges, wherein a bridge that is not allocated to a call is available;

determining by a service controller, in communication with one of the switching systems processing an initiating call, that the initiating call is to initiate a conference;

allocating a particular bridges which the availability information indicates is available, to the initiating call;

updating the availability information associated with the particular bridge to indicate that the particular bridge is allocated to the initiating call; and providing by the service controller, to the switching system processing the initiating call, instructions for routing the initiating call based on the routing information associated with the particular bridge, whereby the initiating call is connected through the network to the particular bridge.

2. A method as claimed in claim 1, comprising:

determining by the service controller, in communication with one of the switching systems processing another call, that the another call is to join the conference initiated by the initiating call;

identifying, from the availability information, the particular bridge allocated to the initiating call; and providing by the service controller, to the switching system processing the another call, instructions for routing the another call based on the routing information associated with the particular bridge, whereby the another call is connected through the network to the particular bridge.

3. A method as claimed in claim 2, wherein the instructions for routing the initiating call include a first directory number, whereby when the initiating call is connected to the first directory number the initiating call has control over conference initiation at the particular bridge.

4. A method as claimed in claim 3, wherein the instructions for routing the another call include a second directory number, whereby when the another call is connected to the second directory number the another call joins the conference at the particular bridge.

5. A method as claimed in claim 2, wherein the step of determining by the service controller that the initiating call is to initiate the conference includes receiving from the initiating call an input primary code, and correlating the input primary code to a predetermined primary authorization code whereby the service controller recognizes the initiating call as being a request for conference initiation; and the step of updating the availability information includes maintaining, by the service controller, a correlation between the particular bridge and the primary authorization code.

6. A method as claimed in claim 5, wherein the step of determining the another call is to join the conference includes receiving from the another call an input secondary code, and correlating the input secondary code to a predetermined secondary authorization code which is paired with the primary authorization code; and the step of identifying the particular bridge includes correlating the primary authorization code, being paired with that secondary authorization code, to the particular bridge.

7. A method as claimed in claim 6, wherein the primary authorization code and the secondary authorization code are the same code.

8. A method as claimed in claim 6, comprising receiving from a first call which occurs prior to the initiating call and the another call, credit or calling card information; and providing to the first call, responsive to validating the received card information, the paired primary and secondary authorization codes.

9. A method as claimed in claim 6, comprising receiving from a switching system processing a first call which occurs prior to the initiating call and the another call, an identification of the first call; providing the paired primary and secondary authorization codes to the first call responsive to validating the received identification; and maintaining an association between the first call identification and the paired codes.

10. A method as claimed in claim 9, wherein the identification of the first call is an automatic number identification (ANI) provided by the switching system processing the first call.

11. A method as claimed in claim 9, wherein the identification of the first call is a calling line identification (CLID) provided by the switching system processing the first call.

12. A method as claimed in claim 2, wherein the another call includes a plurality of calls initiated by respective conference participants.

13. A method as claimed in claim 12, wherein the telecommunications network includes an intelligent network and the service controller is effected at a service control point in the intelligent network.

14. A method as claimed in claim 13, wherein the switching system that processes the initiating call and the switching system that processes the another call are one or more service switching points in the intelligent network.

15. A method as claimed in claim 2, wherein the instructions for routing the initiating call and the instructions for routing the another call include routing the respective calls to a single directory number associated with the particular bridge.

16. A method as claimed in claim 1, comprising:
providing by the switching system that processes the initiating call, to the service controller, a signal indicating that the initiating call connection to the particular bridge has terminated; and
updating the availability information associated with the particular bridge to indicate that the particular bridge is available.

17. A method as claimed in claim 1, comprising:
recording, by the service controller, a first start time corresponding to the initiating call connection to the particular bridge;
providing by the switching system that processes the initiating call, to the service controller, an initiating call terminated signal indicating that the initiating call connection to the particular bridge has terminated; and
responsive to receiving the initiating call terminated signal, updating the availability Information associated with the particular bridge to indicate that the particular bridge is available and recording a first stop time with respect to the initialing call.

18. A method as claimed in claim 17, comprising:
recording, by the service controller, a second start time corresponding to the another call connection to the particular bridge;
providing by the switching system that processes the another call, to the service controller, an another call terminated signal indicating that the another call connection to the particular bridge has terminated; and
recording, responsive to receiving the another call terminated signal, a second stop time with respect to the another call.

19. In a telecommunications network including a plurality of switching systems, one or more of which having one or more conference bridges, a system for effecting a conferencing service comprising:
means for maintaining routing and availability information with respect to the one or more conference bridges, wherein a bridge that is not allocated to a call is available;
means for determining by a service controller, in communication with one of the switching systems processing an initiating call, that the initiating call is to initiate a conference;
means for allocating a particular bridge, which the availability information indicates is available, to the initiating call;
means for updating the availability information associated with the particular bridge to indicate that the particular bridge is allocated to the initiating call; and
means for providing by the service controller, to the switching system processing the initiating call, instructions for routing the initiating call based on the routing information associated with the particular bridge, whereby the initiating call is connected through the network to the particular bridge.

20. A system as claimed in claim 19, comprising:
means for determining by the service controller, in communication with one of the switching systems processing another call, that the another call is to join the conference initiated by the initiating call;
means for identifying, from the availability information, the particular bridge allocated to the initiating call; and
means for providing by the service controller, to the switching system processing the another call, instructions for routing the another call based on the routing information associated with the particular bridge, whereby the another call is connected through the network to the particular bridge.

21. A system as claimed in claim 20, wherein the instructions for routing the initiating call include a first directory number, whereby when the initiating call is connected to the first directory number the initiating call has control over conference initiation at the particular bridge.

22. A system as claimed in claim 21, wherein the instructions for routing the another call include a second directory number, whereby when the another call is connected to the second directory number the another call joins the conference at the particular bridge.

23. A system as claimed in claim 20, wherein the means for determining by the service controller that the initiating call is to initiate the conference includes means for receiving from the initiating call an input primary code, and means for correlating the input primary code to a predetermined primary authorization code whereby the service controller recognizes the initiating call as being a request for conference initiation; and the means for updating the availability information includes means for maintaining, by the service controller, a correlation between the particular bridge and the primary authorization code.

24. A system as claimed in claim 23, wherein the means for determining the another call is to join the conference includes means for receiving from the another call an input secondary code, and means for correlating the input secondary code to a predetermined secondary authorization code which is paired with the primary authorization code; and the means for identifying the particular bridge includes means for correlating the primary authorization code, being paired with that secondary authorization code, to the particular bridge.

25. A system as claimed in claim 24, comprising means for receiving from a first call which occurs prior to the initiating call and the another call, credit or calling card information; and means for providing to the first call, responsive to validating the received card information, the paired primary and secondary authorization codes.

26. A system as claimed in claim 24, comprising means for receiving from a switching system processing a first call which occurs prior to the initiating call and the another call, an identification of the first call; means for providing the paired primary and secondary authorization codes to the first call responsive to validating the received identification; and means for maintaining an association between the first call identification and the paired codes.

27. A system as claimed in claim 26, wherein the identification of the first call is an automatic number identification (ANI) provided by the switching system processing the first call.

28. A system as claimed in claim 26, wherein the identification of the first call is a calling line identification (CLID) provided by the switching system processing the first call.

29. A system as claimed in claim 20, wherein the another call includes a plurality of calls initiated by respective conference participants.

30. A system as claimed in claim 29, wherein the telecommunications network includes an intelligent network and the service controller is effected at a service control point in the intelligent network.

31. A system as claimed in claim 30, wherein the switching system that processes the initiating call and the switching system that processes the another call are one or more service switching points in the intelligent network.

32. A system as claimed in claim 20, wherein the instructions for routing the initiating call and the instructions for routing the another call include routing the respective calls to a single directory number associated with the particular bridge.

33. A system as claimed in claim 20, wherein the primary authorization code and the secondary authorization code are the same code.

34. A system as claimed in claim 19, comprising:

means for providing by the switching system that processes the initiating call, to the service controller, a signal indicating that the initiating call connection to the particular bridge has terminated; and means for updating the availability information associated with the particular bridge to indicate that the particular bridge is available.

35. A system as claimed in claim 19, comprising:

means for recording, by the service controller, a first start time corresponding to the initiating call connection to the particular bridge;

means for providing by switching system that processes the initiating call, to the service controller, an initiating cell terminated signal indicating that the initiating call connection to the particular bridge has terminated; and means, responsive to receiving the initiating call terminated signal, for updating the availability information associated with the particular bridge to indicate that the particular bridge is available and for recording a first stop time with respect to the initiating call.

36. A system as claimed in claim 35, comprising:

means for recording, by the service controller, a second start time corresponding to the another call connection to the particular bridge;

means for providing by the switching system that processes the another call, to the service controller, an another call terminated signal indicating that the another call connection to the particular bridge has terminated; and means for recording, responsive to receiving the another call terminated signal, a second stop time with respect to the another call.

37. In a telecommunications network including a plurality of switching systems, one or more of which having one or more conference bridges, a method of effecting a conferencing service comprising the steps of:

receiving from a switching system processing a first call an identification of the first call;

providing a primary authorization code paired with a secondary authorization code to the first call responsive to validating the received identification;

maintaining an association between the first call identification and the paired primary and secondary authorization codes;

maintaining routing and availability information with respect to the one or more conference bridges, wherein a bridge that is not allocated to a call is available;

determining by a service controller, in communication with one of the switching systems processing an initiating call, that the initiating call is a request for conference initiation, wherein an input primary code is received from the initiating call and correlated to the primary authorization code;

allocating a particular bridge, which the availability information indicates is available, to the initiating call;

updating the availability information associated with the particular bridge to indicate that the particular bridge is allocated to the initiating call, wherein the service controller maintains a correlation between the particular bridge and the primary authorization code;

providing by the service controller, to the switching system processing the initiating call, instructions for routing the initiating call based on the routing information associated with the particular bridge, whereby the initiating call is connected through the network to the particular bridge;

determining by the service controller, in communication with one of the switching systems processing another call, that the another call is to join the conference initiated by the initiating call, wherein an input secondary code is received from the another call and correlated to the secondary authorization code which is paired with the primary authorization code;

identifying, from the availability information, the particular bridge allocated to the initiating call, wherein the primary authorization code, being paired with the secondary authorization code, is correlated to the particular bridge; and providing by the service controller, to the switching system processing the another call, instructions for routing the another call based on the routing information associated with the particular bridge, whereby the another call is connected through the network to the particular bridge.

38. A method as claimed in claim 37, wherein the identification of the first call is an automatic number identification (ANI) provided by the switching system processing the first call.

39. A method as claimed in claim 38, wherein the identification of the first call is a calling line identification (CLID) provided by the switching system processing the first call.

40. In a telecommunications network including a plurality of switching systems, one or more of which having one or more conference bridges, a method of effecting a conferencing service comprising the steps of:

maintaining routing and availability information with respect to the one or more conference bridges, wherein a bridge that is not allocated to a call is available;

determining by a service controller, in communication with one of the switching systems processing an initiating call, that the initiating call is to initiate a conference;

allocating a particular bridge, which the availability Information indicates is available, to the initiating call;

updating the availability information associated with the particular bridge to indicate that the particular bridge is allocated to the initiating call;

providing by the service controller, to the switching system processing the initiating call, instructions for routing the initiating call based on the routing information associated with the particular bridge, whereby the initiating call is connected through the network to the particular bridge;

providing by the switching system that processes the initiating call, to the service controller, a signal indicating that the initiating call connection to the particular bridge has terminated; and updating the availability information associated with the particular bridge to indicate that the particular bridge is available.

41. In a telecommunications network including a plurality of switching systems, one or more of which having one or more conference bridges, a method of effecting a conferencing service comprising the steps of:

maintaining routing and availability information with respect to the one or more conference bridges, wherein a bridge that is not allocated to a call is available;

determining by a service controller, in communication with one of the switching systems processing an initiating call, that the initiating call is to initiate a conference;

allocating a particular bridge, which the availability information indicates is available, to the initiating call;

updating the availability information associated with the particular bridge to indicate that the particular bridge is allocated to the initiating call;

providing by the service controller, to the switching system processing the initiating call, instructions for routing the initiating call based on the routing information associated with the particular bridge, whereby the initiating call is connected through the network to the particular bridge;

recording, by the service controller, a first start time corresponding to the initiating call connection to the particular bridge;

providing by the switching system that processes the initiating call, to the service controller, an initiating call terminated signal indicating that the initiating call connection to the particular bridge has terminated; and responsive to receiving the initiating call terminated signal, updating the availability information associated with the particular bridge to indicate that the particular bridge is available and recording a first stop time with respect to the initiating call.

42. A method as claimed in claim 41, comprising:

recording, by the service controller, a second start time corresponding to the another call connection to the particular bridge;

providing by the switching system that processes the another call, to the service controller, an another call terminated signal indicating that the another call connection to the particular bridge has terminated; and providing by the service controller, to the switching system processing the another call, instructions for routing the another call based on the routing information associated with the particular bridge, whereby the another call is connected through the network to the particular bridge.

43. In a telecommunications network including a plurality of switching systems, one or more of which having one or more conference bridges, a system for effecting a conferencing service comprising:

means for receiving from a switching system processing a first call an identification of the first call;

means for providing a primary authorization code paired with a secondary authorization code to the first call responsive to validating the received identification;

means for maintaining an association between the first call identification and the paired primary and secondary authorization codes;

means for maintaining routing and availability information with respect to the one or more conference bridges, wherein a bridge that is not allocated to a call is available;

means for determining by a service controller, in communication with one of the switching systems processing an initiating call, that the initiating call is a request for conference initiation, wherein an input primary code is received from the initiating call and correlated to the primary authorization code;

means for allocating a particular bridge, which the availability information indicates is available, to the initiating call;

means for updating the availability information associated with the particular bridge to indicate that the particular bridge is allocated to the initiating call, wherein the service controller maintains a correlation between the particular bridge and the primary authorization code;

means for providing by the service controller, to the switching system processing the initiating call, instructions for routing the initiating call based on the routing information associated with the particular bridge, whereby the initiating call is connected through the network to the particular bridge;

means for determining by the service controller, in communication with one of the switching systems processing another call, that the another call is to join the conference initiated by the initiating call, wherein an input secondary code is received from the another call and correlated to the secondary authorization code which is paired with the primary authorization code;

means for identifying, from the availability information, the particular bridge allocated to the initiating call, wherein the primary authorization code, being paired with the secondary authorization code, is correlated to the particular bridge; and means for providing by the service controller, to the switching system processing the another call, instructions for routing the another call based on the routing information associated with the particular bridge, whereby the another call is connected through the network to the particular bridge.

44. A system as claimed in claim 43, wherein the identification of the first call is an automatic number identification (ANI) provided by the switching system processing the first call.

45. A system as claimed in claim 44, wherein the identification of the first call is a calling line identification (CLID) provided by the switching system processing the first call.

46. In a telecommunications network including a plurality of switching systems, one or more of which having one or more conference bridges, a system for effecting a conferencing service comprising:

means for maintaining routing and availability information with respect to the one or more conference bridges, wherein a bridge that is not allocated to a call is available;

means for determining by a service controller, in communication with one of the switching systems processing an initiating call, that the initiating call is to initiate a conference;

means for allocating a particular bridge, which the availability information indicates is available, to the initiating call;

means for updating the availability information associated with the particular bridge to indicate that the particular bridge is allocated to the initiating call;

means for providing by the service controller, to the switching system processing the initiating call, instructions for routing the initiating call based on the routing information associated with the particular bridge, whereby the initiating call is connected through the network to the particular bridge;

means for providing by the switching system that processes the initiating call, to the service controller, a signal indicating that the initiating call connection to the particular bridge has terminated; and means for updating the availability information associated with the particular bridge to indicate that the particular bridge is available.

47. In a telecommunications network including a plurality of switching systems, one or more of which having one or more conference bridges, a system for effecting a conferencing service comprising:

means for maintaining routing and availability information with respect to the one or more conference bridges, wherein a bridge that is not allocated to a call is available;

means for determining by a service controller, in communication with one of the switching systems processing an initiating call, that the initiating call is to initiate a conference;

means for allocating a particular bridge, which the availability information indicates is available, to the initiating call;

means for updating the availability information associated with the particular bridge to indicate that the particular bridge is allocated to the initiating call;

means for providing by the service controller, to the switching system processing the initiating call, instructions for routing the initiating call based on the routing information associated with the particular bridge, whereby the initiating call is connected through the network to the particular bridge;

means for recording, by the service controller, a first start time corresponding to the initiating call connection to the particular bridge;

means for providing by the switching system that processes the initiating call, to the service controller, an initiating call terminated signal indicating that the initiating call connection to the particular bridge has terminated; and means for responsive to receiving the initiating call terminated signal, updating the availability information associated with the particular bridge to indicate that the particular bridge is available and recording a first stop time with respect to the initiating call.

48. A system as claimed in claim 47, comprising:

means for recording, by the service controller, a second start time corresponding to the another call connection to the particular bridge;

means for providing by the switching system that processes the another call, to the service controller, an another call terminated signal indicating that the another call connection to the particular bridge has terminated; and means for providing by the service controller, to the switching system processing the another call, instructions for routing the another call based on the routing information associated with the particular bridge, whereby the another call is connected through the network to the particular bridge.

* * * * *